Figure 1:
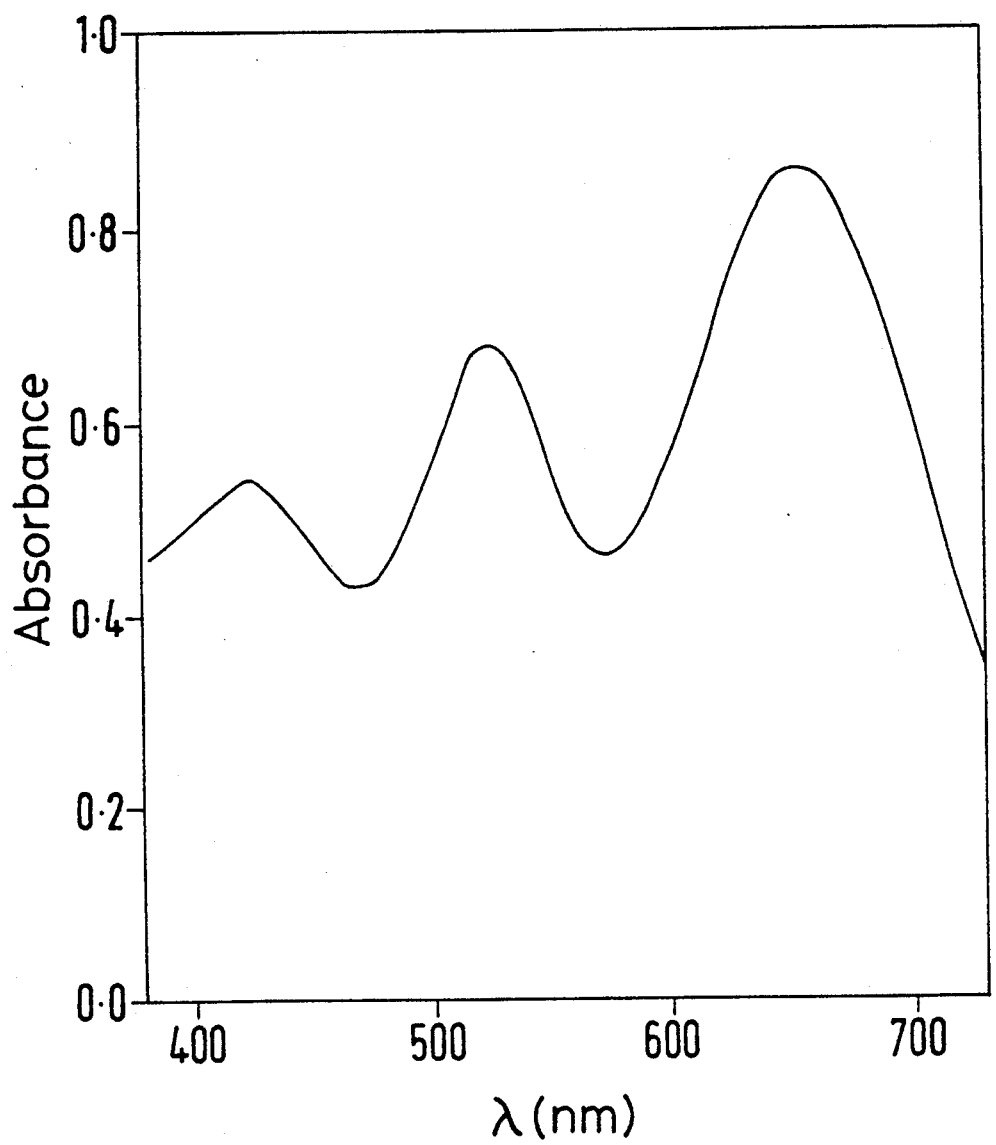

United States Patent [19]

Cawse et al.

[11] Patent Number: 5,017,667

[45] Date of Patent: May 21, 1991

[54] PREPARATION OF LATEXES OF COLOR COUPLER POLYMERS

[75] Inventors: John L. Cawse, Macclesfield; Philip J. Harris, Stockport, both of England

[73] Assignee: Ilford Limited, Cheshire, England

[21] Appl. No.: 284,117

[22] Filed: Dec. 14, 1988

[30] Foreign Application Priority Data

Dec. 15, 1987 [GB] United Kingdom ............... 8729197

[51] Int. Cl.⁵ ............................................. C08F 26/08
[52] U.S. Cl. ..................................... 526/264; 430/548
[58] Field of Search .................. 526/262, 264; 430/548

[56] References Cited

U.S. PATENT DOCUMENTS 3,926,436  12/1975  Monbaliu et al. ................... 430/548
4,080,211   3/1978  Van Paesschen et al. ............ 526/89

Primary Examiner—Joseph L. Schofer
Assistant Examiner—Alex H. Walker
Attorney, Agent, or Firm—Wenderoth, Lind & Ponack

[57] ABSTRACT

A method of preparing a latex of a color coupler polymer which method in characterized in that it comprises dissolving in at least one ethylenically unsaturated non-coupling monomer which is liquid at room temperature at least two monomeric color couplers, the total amount of couplers being from 1 to 50% by weight of the non-coupling monomer, and dispersing this solution in an aqueous solution of a surfactant and a polymerization initiating system, and wherein the melting point of the mixture of monomeric color couplers is below the reaction temperature of said polmerization system.

13 Claims, 1 Drawing Sheet

PREPARATION OF LATEXES OF COLOR COUPLER POLYMERS

This invention relates to a new process for the preparation of latexes of colour coupler polymers. Polymeric colour couplers are finding increasing use in photographic material instead of colour couplers which require to be incorporated in photographic layers dissolved in an oil. The presence of the oil leads to several disadvantages including rendering the layer which comprises it soft and thus liable to mechanical deformation. Furthermore photographic material in which the colour couplers are present as a polymer latex can be much thinner than material in which the colour couplers are dissolved in oil. This decrease in thickness leads to sharper images being obtained.

However it has been found to be difficult to produce latexes of polymeric colour couplers easily and economically. One reason is that owing to the high melting point of most monomeric colour couplers and their limited solubility in most of the suitable comonomers and/or inert solvents there is a marked tendency for the couplers to crystalise out of the monomer feed during the time over which the monomer feed is introduced to the reaction vessel. This necessitates keeping the monomer solution hot to prevent crystallisation. However it is known that it is inadvisable to maintain bulk solutions of monomers at elevated temperatures for prolonged periods of time owing to the serious risk of spontaneous thermally induced polymerization of the monomer mixture occurring rapidly and exothermically.

This will result in at worst a solid block of coupler polymer in the feed vessel and at best a partially polymerized and ill-defined mixture of oligomer monomer and polymer being fed into the reaction vessel. It is possible to control the polymerization tendency by addition of inhibitors to the monomer solution, but this will of course lead to inhibition of the subsequent emulsion polymerization.

A further problem is experienced in these types of reaction in that frequently the coupler monomer will crystallise out of the hot monomer solution as soon as the latter contacts the surface of the water in the polymerization vessel. This results in the formation of crystals on the vessel, which can act as nuclei for further build up of monomer and/or polymer as coagulum, and further means that the amount of coupler entering the polymer is ill-defined. This in turn means that the activity and colour density of the coupler polymer may differ from batch to batch.

Although the use of an inert solvent may ease the above problems, it is necessary to remove this solvent after completing the emulsion polymerization. This not only involves an inconvenient extra stage in the latex synthesis, but can also lead to further coagulation of the latex as the solvent is distilled out of the latex/solvent mixture.

However in U.S. Pat. No. 4,080,211 there is described method of copolymerisation a solid monomeric coupler (possessing ethylenic unsaturation) with other non coupling monomers the monomeric coupler having a melting point above the temperature of the emulsion polymerization is dissolved in the non-coupling monomer, which is generally a liquid acrylate.

In addition an inert non polymerisable solvent may be used to improve solubility of the monomeric coupler. The solution of monomeric coupler is then fed over a period of for example 1 to 2 hours into a vessel containing the necessary components to convert the monomer solution into a polymeric latex. These components will include water surfactants and polymerization intitiators.

However in most of the examples quoted the temperature during the reaction is raised to well over 100° C. with the consequent risk of spontaneous uncontrolled polymerization.

We have now found a method of preparing a polymeric latex colour coupler which can be carried out at a much lower temperature.

Therefore according to the present invention there is provided a method of preparing a latex of a colour coupler polymer which method is characterized it that it comprises dissolving in at least one ethylenically unsaturated non coupling monomer which is liquid at room temperature at least two monomeric colour couplers, the total amount of colour couplers being from 1 to 50% by weight of the non coupling monomer and dispersing this solution in an aqueous solution of a surfactant and a polymerization initiating system, and wherein the melting point of the mixture of the monomeric colour couplers is below the reaction temperature of said polymerization system.

Preferably the total amount of colour couplers is from 10 to 30% by weight of the non coupling monomer(s) present. Preferably when there are two couplers present there is at least 10% by weight of one coupler of the total weight of the couplers used and when there are three couplers used there is at least 10% by weight of each coupler of the total weight of the colour couplers used.

Most preferably three monomeric colour couplers are used and substantially about equal weights of the three monomeric colour couplers are used.

The ethylenically unsaturated non coupling monomer or mixtures thereof which are liquid at room temperature are chosen to impart improved physical properties to the monomer. Thus they are chosen to ensure that a latex polymer is produced having optimum physical properties, such as glass transition temperature, compatibility with the gelatin used in preparing coating solutions acceptable permeability to developer solutions, suitable refractive index, as well as beneficial rates of copolymerisation with the coupler monomers and the ability to confer lowered viscosity and reasonable miscibility with the mixture of coupler monomers.

Thus suitable comonomers include methyl acrylate ethyl acrylate, butyl acrylate ethyl hexyl acrylate vinyl acetate, hydroxyethyl methacrylate hydroxypropylmethacrylate, methacrylic acid acrylic acid itaconic acid. 2.carboxy ethyl acrylates and the salts thereof methacrylamide N-hydroxymethyl acrylamide; styrene N-vinyl pyrrolidone 1.vinyl imidazole, 4-vinyl pyridine dimethylamino ethyl methacrylate, tetrahydrofurfuryl methacrylate, acrylonitrite and vinylidene chloride, although this list is not intended to be comprehensive. In addition, crosslinking monomers may be used such as divinyl benezene, ethylene dimethacrylate trivinyl cyclohexane and trimethylolpropane triacrylate.

Preferred comonomers are methyl acrylate butyl acrylate and hydroxypropylmethacrylate or a mixture of any two or all three of these monomers. The surface active agents used in the preparation of latices of the present invention include ethoxylates, sorbitan esters aryl phenol alkoxylates, alkyl alkanolamides; sulphonates sulphosuccinates aryl sulphonates, polyalkoxy sulphates alkyl phosphates, aryl phenol phosphates, sarcosinates, copolymerisable surfactants such as allyl sulphosuccinates and preferably alkyl taurates.

The initiators and intitiator systems used for the preparation of the latices may be persulphates, azo compounds, peroxides or any of the other well known initiators used for emulsion polymerization including redox system. Examples of these initiator systems may be found in the book "Emulsion Polymerization" by D Blackley Applied Science Publishers. 1975 page Chapter 6 pages 155-250.

The methods for the preparation of the latices of the present invention may make use of techniques such as "seed" polymerization and of core-shell techniques as well as "power-feed" procedures and other methods well known in the art. Latices may be prepared in bulk semi-continuously or continuously using any of the known designs of apparatus.

The colour couplers of use in the present invention include monomeric yellow colour couplers, monomeric magenta colour couplers and monomeric cyan colour couplers. Also included are monomers of so called white competing couplers. These compounds have a similar structure to the yellow or magenta colour couplers but one hydrogen of the active methylene groups is replaced by alkyl or substituted alkyl. Such compounds can couple with an oxidized colour developer but the resultant reaction product can not rearrange to form a dye.

Examples of all these monomeric colour couplers are to be found in U.S. Pat. No. 3,926,436.

Any of the monomeric coupler couplers described in the prior art may be used in the polymeric colour former of the present invention. The colour coupler portion of the monomer may comprise ballasting groups or leaving groups for example so that the colour coupler may act as a two equivalent coupler.

Examples of yellow forming monomeric colour couplers include couplers of the general formula I

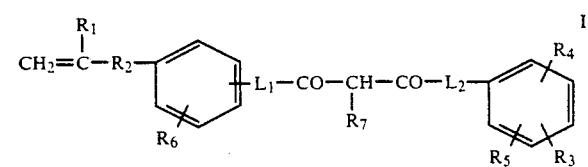

where $R_1$ is hydrogen, methyl chlorine or bromine. $R_2$ is a divalent organic radical, each of $R_3$, $R_4$, $R_5$ and $R_6$ are hydrogen, halogen, alkoxy, sulphoxy or sulphonamido, $R_7$ is hydrogen or a leaving group and $L_1$ and $L_2$ are direct linkages or —NH—.

Particularly useful linking groups $R_2$ are —CO—NH— and —O—CH$_2$CH$_2$NHSO$_2$—

Preferably one of $L_1$ and $L_2$ is a direct linkage. An example of such a monomer is Monomer B which is used in the Examples which follow.

This monomer has the formula:

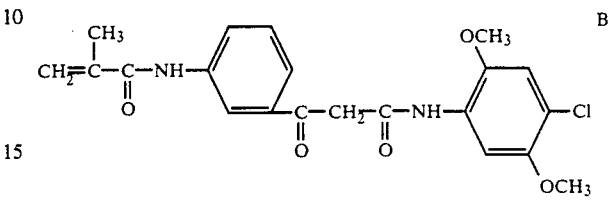

Another example of a monomer of general formula I has the formula II:

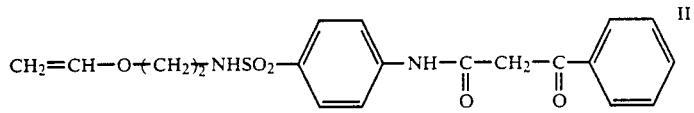

A further example of a monomer of general formula I which has a leaving groups is the monomer of the formula III:

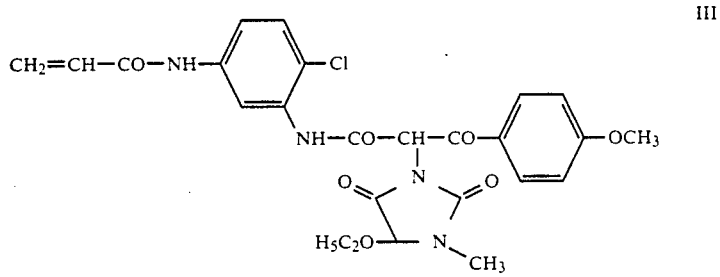

Monomeric yellow colour couplers of formula I are described in U.S. Pat. No. 4,080,211.

Another class of yellow dye forming a monomeric colour couplers have a pivaloyl end group rather than a benzyl end group.

Such colour couplers have the general formula IV:

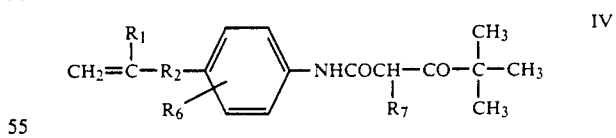

where $R_1$, $R_2$, $R_6$ and $R_7$ have the meanings assigned to the above.

An example of such a coupler has the formula V:

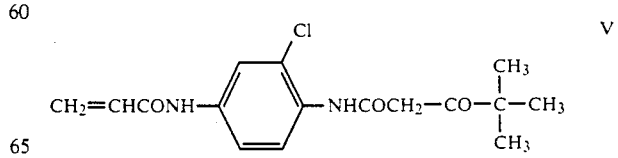

Examples of magenta forming monomeric colour couplers include couplers of the general formula VI:

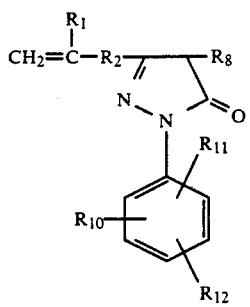
VI

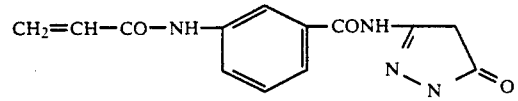
VIII
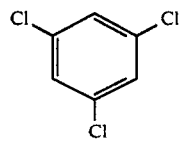

where $R_1$ and $R_2$ are as defined above, $R_8$ is hydrogen or a leaving group and $R_{10}$, $R_{11}$ and $R_{12}$ are each hydrogen, haloge or alkoxy having 1 to 4 carbon atoms.

Preferably $R_1$ is hydrogen or —$CH_3$

Preferably $R_2$ is —CO NH—

However other useful linking groups $R_2$ include —CO NH$(CH_2)_x$—O—CO—NH where x is 2–6,

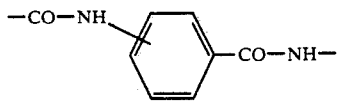

and

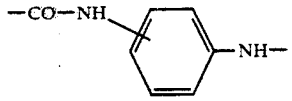

where in the above two formulae the phenylene group is optionally substituted by chlorine or alkyl having 1 to 4 carbon atoms.

Particularly useful monomers of formula VI are those wherein at least two of $R_{10}$, $R_{11}$ and $R_{12}$ are chlorine atoms.

Examples of leaving groups $R_8$ include the group —S—$R_9$ where $R_9$ is a long chain alkyl group having over 10 carbon atoms or is a substituted phenyl group having at least one alkyl or alkoxy group. Preferably $R_9$ when an alkyl group has from 12 to 20 carbon atoms.

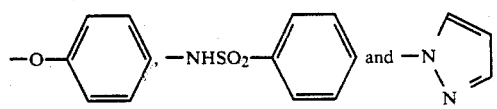

Examples of monomers of formula VI are:

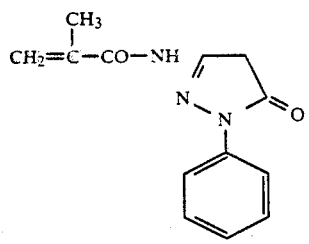
VII

IX
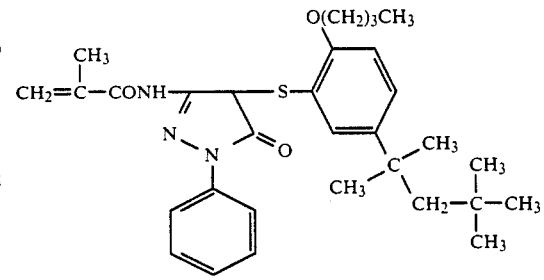

and Monomer A which is used in the Examples which follow and which has the formula:

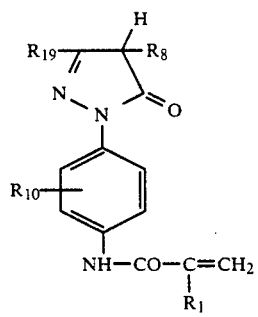
A

Monomeric magenta colour couplers of formula VI are described in E.P. 133262.

Another type of magenta dye forming monomeric colour couplers are those of general formula X:

X wherein $R_1$, $R_8$ and $R_{10}$ are as defined above and $R_{19}$ is alkyl, dialkyl amino, optionally substituted phenyl and optionally substituted acylamino. Substitutents in the phenyl or acylamino groups include alkyl groups having from 2 to 6 carbon atoms and chloric.

These couplers may be prepared by reacting magenta colour couplers of the formula XI:

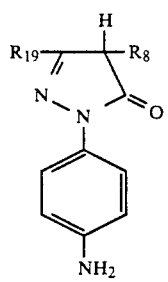

with acryloyl or methacryloyl chloride.

Examples of cyan forming monomeric colour couplers include phenol couplers of the general formula XII:

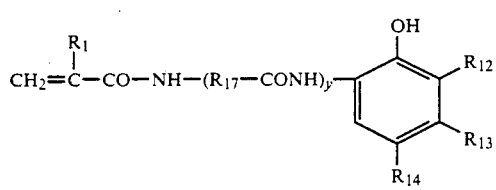

and of general formula XIII:

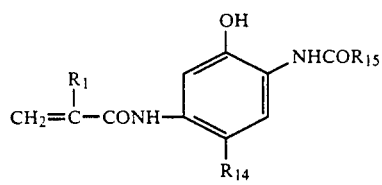

and a naphthol coupler of the general formula XIV :

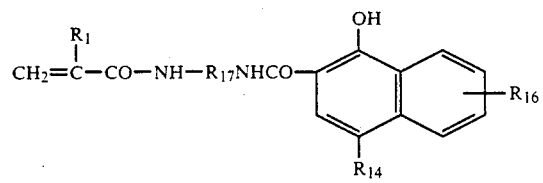

wherein the above three formulae $R_1$ is or as defined above $R_{12}$ is hydrogen or halogen, $R_{14}$ is hydrogen or halogen or a substituted alkoxy group, $R_{13}$ is hydrogen or alkyl having 1 to 5 carbon atoms, $R_{15}$ is optionally substituted alkyl or acylamino group and $R_{17}$ is a linking group and y is 0 or 1, and $R_{16}$ is alkoxy, amino, amido sulphonamido group or a hydrogen atom Preferably $R_1$ is hydrogen or methyl.

Examples of the linking groups $R_{17}$ include alkylene chains of 2 to 6 carbon atoms including interupted alkylene clains and alkyl or substituted alkyl groups for example

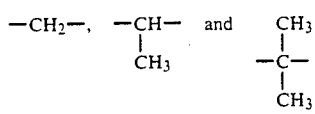

Examples of monomers of formula XIV are :

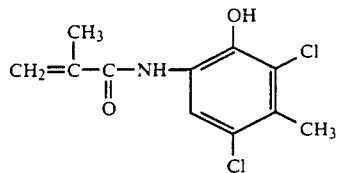

This is Monomer C which is used in the Examples which follow

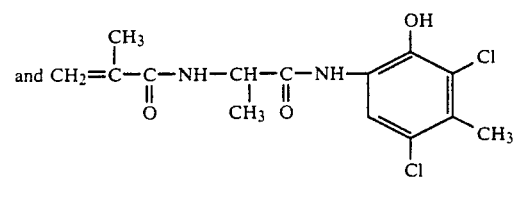

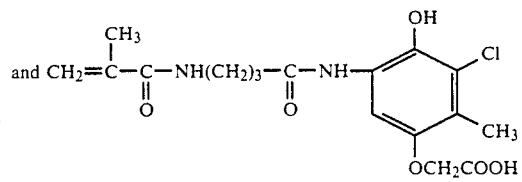

Examples of monomers of formula XIII are:

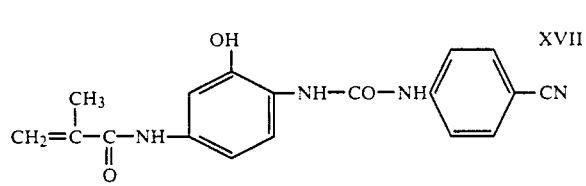

Examples of monomers of formula XIV are:

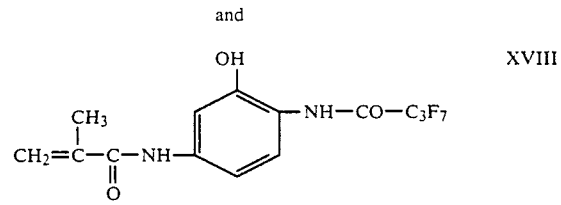

Monomeric colour couplers of general formula XIV are described in B.P. 2,133,170.

The colour coupler polymer formed by the process of the present invention may comprise a great variety of colour couplers. For example when two colour coupler monomers are used they may be magenta colour coupler a yellow colour coupler or a cyan colour coupler together with a white competing coupler. Or they may be a magenta colour coupler a yellow colour coupler or a cyan colour coupler together with one of these colour couplers which comprises a leaving group. Or two of these couplers may be used together to yield a blue green or red dye in the photographic material after the colour coupling reaction has taken place. When as is preferred three colour coupler monomers are present it may comprise equal amounts of yellow cyan and magenta coupler residues in which case after coupling a black or blackish dye is obtained. It may comprise three magenta type colour coupler residues for example a magenta colour coupler of formula I a magenta colour coupler of the same formula but having a leaving group in the coupling position and a white competing coupler having a benzyl group in the coupling position. It would be possible of course to utilize three entirely different magenta colour couplers but the resultant dye would be of rather uncertain hue.

If it were required to produce red, green or blue dyes using three colour coupler monomers then a mixture of the two appropriate subtractive monomeric colour couplers with a white competing coupler could be used. Thus a very wide range of dyes can be produced using the polymer prepared by the process of the present invention.

In the process of the present invention the use of at least two monomeric colour couplers has the effect of depressing the cyrstallisation tendency of the couplers. In general when suitable proportions of the couplers are used the solidification point of a mixture of the couplers is in itself significantly lower than the melting point of the individual coupler monomers and will be below the temperature of the emulsion polymerization reaction. Thus emulsion polymerizations of this type are often carried out at 80° to 90° C., and it is possible to find mixture of coupler monomers which, while the individual couplers may have melting points exceeding 150° C., when present as mixtures they solidify well below 70° C.

When mixtures of monomeric colour couplers are mixed with an additional non-coupling monomer, such as a simple acrylate ester, there is a considerably reduced tendency of the individual couplers to crystallise either in the feed solution or when the monomer mixture is fed into the reaction vessel. In fact the coupler monomer mixture tends to form oily droplets rather than solid particles when introduced into the polymerization vessel. Accordingly the following advantages are found in the method of the present invention:

1. Reduced crystallisation tendency when feeding the monomer solution to the aqueous polymerization solution.
2. Less heat required to maintain monomers in solution.
3. Reduced incidence of thermally induced polymerization in feed.
4. Reduced tendency for crystallisation in reaction medium.
5 Less coagulum build up, consequent on (4.)
6 More predictable composition of coupler polymer.

Additionally, it is possible to use higher concentrations of coupler in the polymer than would normally be the case, since fewer crystallisation and coagulation problems will be experienced.

However as hereinbefore stated all these benefits are more readily obtainable when three or more colour coupler monomers are used in the process of the present invention. When only two are used a great improvement is exhibited over the process of the prior art wherein only one colour coupler monomer is used According to a further feature of the present invention there is provided a method of preparing colour photographic material which comprises forming a colour coupler polymer latex as just described, mixing this polymer latex with an aqueous gelatino silver halide emulsion and coating the emulsion on a photographic base.

Photographic material may comprise one gelatino silver halide emulsion layer comprising a colour coupler polymer latex prepared by the method of the present invention, two such silver halide emulsion layers or three such layers. In the last case the three layers will most likely be a silver halide layer in which on development the polymeric colour coupler yields a yellow dye a layer in which the polymeric colour coupler yields a cyan dye and a layer in which the polymeric colour coupler yields a magenta dye.

The following examples will serve to illustrate the invention.

Comparative Example I

Preparation of a magenta coupler latex comprising only the monomeric colour coupler.

To a solution of sodium oleyl methyl taurate (0 16 g) in 15 8 ml distilled water maintained at 80° C. in a 100 ml reaction vessel was added, under nitrogen atmosphere and with mechanical stirring, a potassium persulphate (70 mg) and sodium metabisulphite (10 mg) After 2 minutes there was commenced addition of a heated monomer solution comprising Monomer A (1.00 g), hydroxy-propyl methacrylate (2.00 g) and butyl acrylate (3.00 g) and of a surfactant solution comprising water 5.00 g sodium oleyl methyl taurate 0.16 g and potassium persulphate 40 mg.

The vessel containing the monomer solution was kept at about 50° C. in order to maintain most of the coupler in solution, and occasionally heated to above 80° C. to redissolve crystals of the monomer. The monomer and surfactant streams were fed over 2 hours after which the latex was heated for a further 1.5 hours at 80° C. then cooled and filtered.

There was obtained a latex of 21% solids content particle size 117 nm (determined by a Nanosizer of Coulter Instruments Limited) and there was retrieved from the vessel and stirrer a total of 0.15 gram of buff coloured material identified by thin layer chromatography to be largely unconverted Monomer A. The melting point of Monomer A was 152° C. and the reaction temperature of the polymerization system was 80° C.

Comparative Example II

Preparation of a yellow coupler latex, comprising only one monomeric yellow colour coupler.

The procedure of Example (I) was followed but substituting Monomer B for Monomer A. The coupler monomer eventually dissolved in the butyl acrylate hydroxypropylmethacrylate mixture by heating to above 80° C. Throughout the monomer addition crystallisation of the yellow monomer occurred and if the temperature of the coupler monomer solution dropped below 40° C. the entire solution solidified. It was therefore necessary to keep the solution at 80° C. to avoid crystallisation. Towards the end of the monomer addition period, the coupler monomer solution thickened due to thermal polymerization.

There was formed a latex having solids content 15%, particle size 70 nm. and 0.44 g of partly polymeric partly monomeric material was retrieved from the stirrer and vessel.

The melting point of monomer B was 132° C. and the reaction temperature of the polymerization system was 80° C.

Comparative Example III

Preparation of a cyan polymer coupler latex comprising only one monomeric cyan colour coupler. The procedure of Example (I) was followed except substituting monomer III for monomer A.

The cyan monomer dissolved quite readily in the butyl acrylate hydroxypropyl methacrylate mixture The solution was kept warm at about 40° C. during monomer addition. The latex thus formed was very gritty, as cyan coupler monomer had crystallised on contact with the water in the reaction vessel. The latex had solids content 24% particle size 72 nm. but 0.23 g of grit was filtered from the latex and further gritty material was deposited during several days standing of the latex.

The melting point of monomer C was 142° C. and the reaction temperature of the polymerization system was 80° C.

Example IV

Preparation of a latex using two monomeric colour couplers.

The method of the previous examples was followed except that there was used a mixture of 0.5 g of Monomer A and 0.5 g Monomer B.

Once the coupler mixture had been dissolved by warming in the butyl acrylate hydroxypropylmethacrylate mixture, there was very little tendency for crystallisation to occur, particularly in the tap of the feed vessel. It was therefore necessary to keep the liquid warmed to about 40° C. at most. There was obtained a slightly pinkish latex having solids content 21%, particle size 82 nm and 0.12 g material was retrieved from the stirrer and vessel walls. This was shown to be polymeric and not to contain unconverted monomer.

The melting point of the mixture of the two monomers was below 70° C. whilst the reaction temperature of the polymerization temperature was 80° C.

Example V

Preparation of a latex using three monomeric colour couplers and its use in the preparation of a photographic material.

The preparation was carried out as in comparative Example I except that instead of Monomer A only being used 0.34 g of each of Monomers A. B and C were used. The colour coupler monomers dissolved easily in the non-coupling monomer mixture and no crystallisation occurred in the feed lines when this solution was fed to the aqueous polymerization solution. There was no crystallisation when the monomer solution which was maintained at 30°-40° C. for the whole two hours during the feed was fed into the aqueous solution. As before the resultant latex was heated for a further 1 ½ hours at 80° C., then cooled and filtered. The latex was a faintly pink colour and had a solids content of 22% with a particle size of 72 nm Only 0.04g of coagulum was present in the reaction vessel after the latex had been removed therefrom.

The latex as just prepared was used to prepare colour photographic material. To 2.2 ml of an undyed twinned crystal iodobromide gelatin emulsion there was added 0 4 ml of the latex and 7 ml of water. To this emulsion there was added 0.4 ml of a 3% solution of triazine hardner. The emulsion was then coated on clear cellulose triacetate base to provide a silver coating weight of 12 mg/dm². The coating was dried and inspected in green light to show a clear, glossy coating. This photographic material was then exposed to a white light source for 10 seconds and processed in a colour developing solution for 3.25 minutes at 38 C.

The formula of the developing solution used is as follows :

| Potassium Carbonate | 37.5 g |
| Sodium Sulphite | 4.5 g |
| Nitrilotriacetate (sequestering agent) | 2 g |
| Sodium hydroxide | 0.6 g |
| Sodium bromide | 0.9 g |
| Hydroxylamine sulphate | 2.8 g |
| Developing agent | 5.25 g |
| Water | 1 liter |

The formula of the developing agent is :

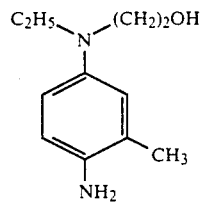

The photographic material was then passed to a bleach bath for 6.5 minutes at 35° C.

| ammonium bromide | 150 g |
| ferric EDTA 1.8 m | 150 g |
| sodium nitrate | 20 g |
| water to | 1 liter |

The material was then passed to a fixing bath at 35° C. for 6 ½ minutes of the formula:

| ammonium thiosulphate (80% w/v) | 190 cm |
| sodium sulphite | 19 g |
| sodium EDTA | 1.5 g |
| water to | 1 liter |

The material was then washed for 3 minutes i water at 30° C. and then dried. A neutral grey image was present on the photographic material. This image had the visible absorption spectrum shown in the accompanying FIG. 1. This shows that the material has good absorption in the blue, green and red regions of the visible spectrum.

The mixture of the monomers A, B and C remained as a melt at C whilst the reaction temperature of the polymerization system was 80° C.

Example VI

Preparation of a latex using three monomeric colour couplers

The method of Example V was followed except that 0.34g of Monomers A and B were used together with 0.34 g of another magenta monomer of the formula :

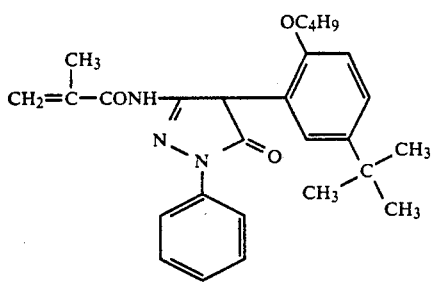

hereinafter referred to as Monomer D. The non-coupling monomers used were 3.0 g of butyl acrylate as in Example I and 2 0 g of methyl acrylate instead of the hydroxypropyl methacrylate. The couplers all dissolved at 80° C. very quickly and it was not necessary to heat the solution further to keep them in solution. There was obtained a latex having a solids content of and a particle size of 84 nm. Only about 0.09 g of coagulum was present in the reaction vessel after the latex had been removed therefrom.

The mixture of the three monomers remained as a melt below 60° C. whilst the reaction temperature of the polymerization system was 80° C.

This latex was used to prepare colour photographic material as in Example V. After the photographic material had been exposed and processed as in Example V a reddish magenta image was obtained.

Example VII

Preparation of a latex using three monomeric colour couplers.

The method of Example V was followed except that there was used 0.34 g of Monomer A 0.34g of Monomer D and 0.34 g of third magenta monomer of the formula

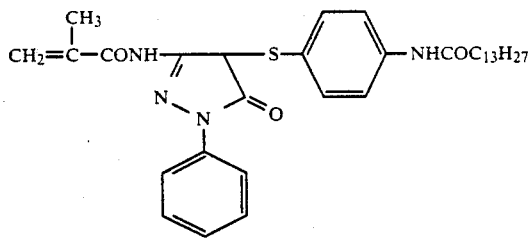

herein after named Monomer E.

The non-coupling monomers used were the same as in Example V

The couplers all dissolved at 80° C. very quickly and it was necessary to maintain the solution at only 30°–40° C. to maintain the monomers in solution.

There was obtained a latex having a solids content of 18% and a particle size of 71 nm. Only about 0.06 g of coagulum was present in the reaction vessel after the latex had been removed therefrom.

This latex was used to prepare colour photographic material as in Example V. After the photographic material had been exposed and processed as in Example V a good magenta dye image was obtained.

The mixture of the three monomers remained as melt below 60° C. whilst the reaction temperature of the polymerization system was 80° C.

We claim:

1. A method of preparing a latex of a colour coupler polymer which method in characterized in that it comprises dissolving in at least one ethylenically unsaturated non-coupling monomer which is liquid at room temperature at least two monomeric colour couplers the total amount of couplers being from 1 to 50% by weight of the non-coupling monomer, and dispersing this solution in an aqueous solution of a surfactant and a polymerization initiating system, and wherein the melting point of the mixture of monomeric colour couplers is below the reaction temperature of said polymerization system.

2. A method according to claim 1 wherein the total amount of the colour couplers is from 10 to 30% by weight of the non-coupling monomer.

3. A method according to claim 2 wherein when two colour couplers are used in the method there is at least 10 by weight of one colour coupler of the total weight of the colour couplers used.

4. A method according to claim 1 wherein when three monomeric colour couplers are used there is at least 10% by weight of each colour coupler of the total weight of the colour couplers used.

5. A method according to claim 4 wherein three colour couplers are used in substantially equal weight 6. A method according to any one of claims 1 to 5 wherein the photographically inert comonomer is methyl acrylate ethyl acrylate, butyl acrylate ethyl hexyl acrylate vinyl acetate; hydroxyethyl methacrylate hydroxpropylmethacrylate, methacrylic acid, acrylic acid itaconic acid. 2.carboxyethyl acrylate and the salts thereof acrylamide, methacrylamie, N-hydroxymethyl acrylamide styrene, N.vinyl pyrrolidone, 1.vinyl imidazol; 4.vinylpyridine dimethylamino ethyl methacrylate tetrahydrofurfuryl methacrylate. sulphoethyl methacrylate vinyl sulphonic acid and salts thereof, acrylonitrile and vinylidene chloride.

7. A method according to claim 6 wherein the photographically inert comonomer is methyl acrylate, butyl acrylate or hydroxypropyl methacrylate or a mixture of any two or all three of these monomers.

8. A method according to claim 1 which comprises the residue of a yellow dye forming monomeric colour coupler of the general formula :

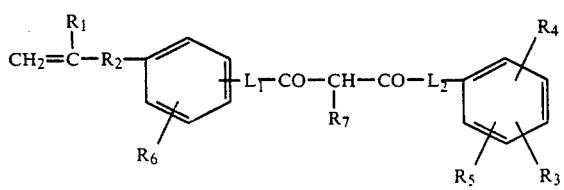

wherein each of $R_3$, $R_4$, $R_5$ and $R_6$ are hydrogen, halogen, alkoxy, sulphoxy or sulphonamido, $R_1$ and $R_2$ are as defined in claim 1 $R_7$ is hydrogen or a leaving group and $L_1$ and $L_2$ are direct linkages or —NH— or of the general formula:

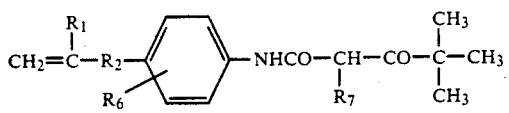

wherein $R_1$ and $R_2$ and $R_6$ and $R_7$ are as defined above.

9. A method according to claim 1 which comprises the residue of a magenta dye forming monomeric colour coupler of the general formula:

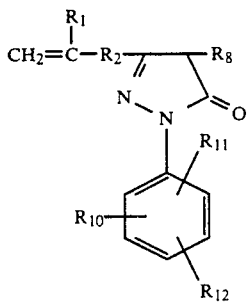

where $R_1$ and $R_2$ are as defined in claim 1, $R_8$ is hydrogen or a leaving group and $R_{10}$, $R_{11}$ and $R_{12}$ are each hydrogen, halogen or alkoxy, or of the general formula

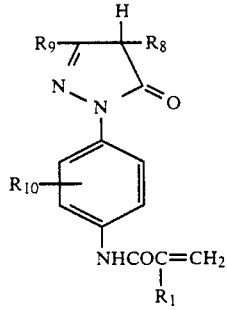

wherein $R_1$, $R_8$ and $R_{10}$ are as defined above and $R_9$ is alkyl, dialkylamino, optionally substituted aryl and optionally substituted acylamino.

10. A method according to claim 1 which comprises the residue of a cyan dye forming monomeric colour coupler which is a phenol coupler of the general formula:

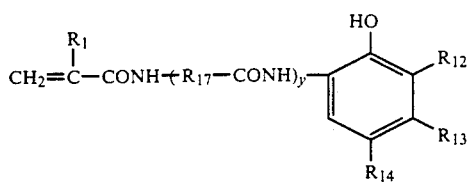

or is a phenol coupler of the general formula:

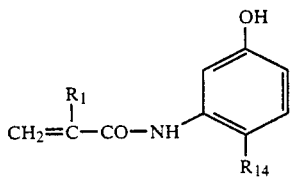

or is a naphthol coupler of the general formula

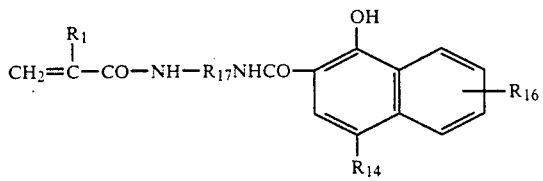

wherein the above three formula $R_1$ and $R_{12}$ are as defined in charm 9. $R_{14}$ is hydrogen or a leaving group such as chlorine or a substituted alkoxy group $R_{13}$ is hydrogen or alkyl having 1 to 5 carbon atoms, $R_{15}$ is optionally substituted alkyl or acylamino group and $R_{17}$ is a linking group and y is 0 or 1. $R_{16}$ is an alkoxy, amino, amido, sulphonamide group or a hydrogen atom.

11. A method according to claim 1 wherein the surfactant used is an alkyl taurate.

12. A method according to claim 1 wherein the polymerization initiator is a persulphate.

13. A method of preparing colour photographic material which comprises forming a colour coupler polymer latex according to the method of claim 1 mixing this polymer latex with an aqueous gelatino silver halide emulsion and coating the emulsion on a photographic base.

* * * * *